May 31, 1949.    R. L. CANNON    2,471,723
FISHING REEL
Filed Sept. 16, 1946

INVENTOR.
Richard L. Cannon
BY
Glenn L. Fish
ATTORNEY

Patented May 31, 1949

2,471,723

UNITED STATES PATENT OFFICE 2,471,723

FISHING REEL

Richard L. Cannon, Spokane, Wash.

Application September 16, 1946, Serial No. 697,196

3 Claims. (Cl. 242—84.5)

My present invention relates to an improved fishing reel and more particularly to a reel having a winding disk and a clutch therebetween so that should the hooked fish turn to flee, the clutch will permit the reel to unwind even though the operator is winding. This structure will permit the operator to eliminate any slack in the line at all times, and other advantages will be hereinafter described.

In the accompanying drawings I have illustrated one complete example of the physical embodiment of my invention according to the best mode I have thus far devised, but it will be understood that various changes and alterations may be made in the exemplified structure within the scope of the appended claims.

Figure 1:
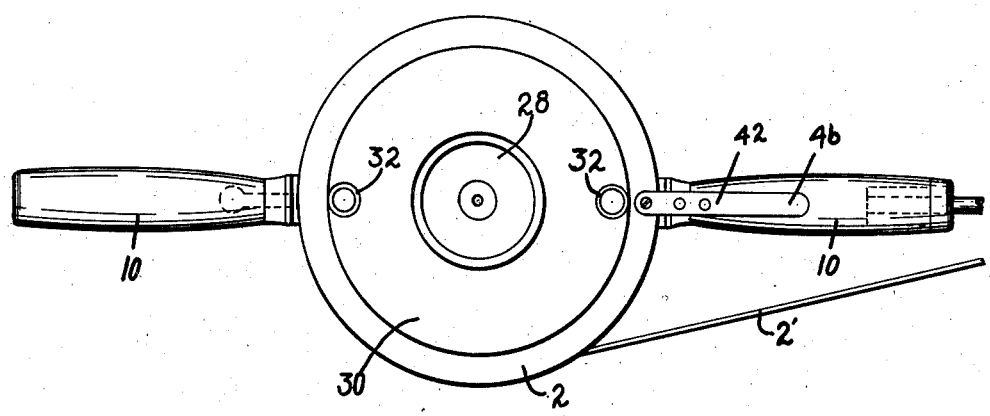
Fig. 1 is a side elevation of the reel of my invention mounted between the handles.
Figure 2:
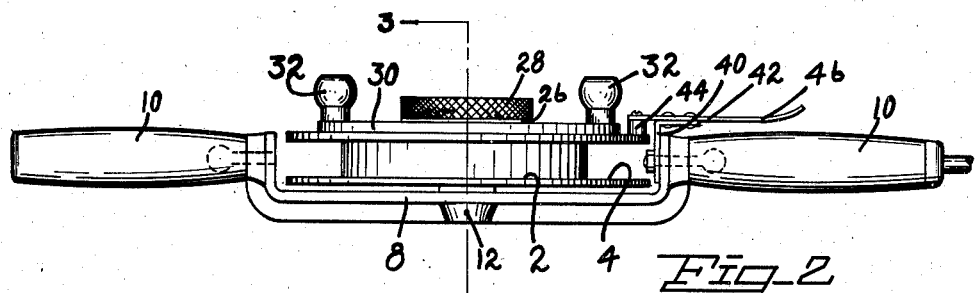
Fig. 2 is a plan view thereof.
Figure 3:
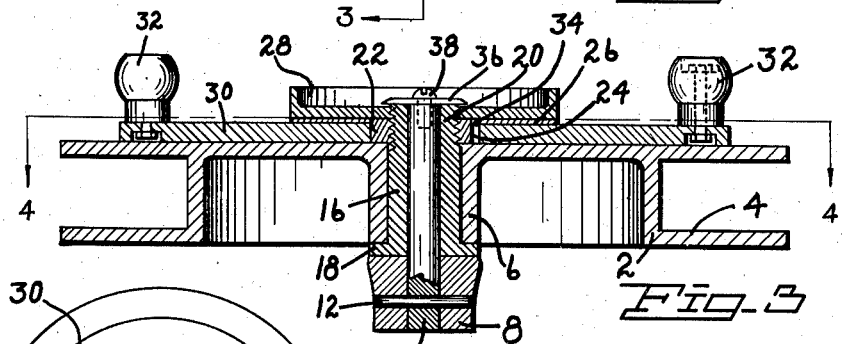
Fig. 3 is a sectional view taken on line 3—3 of Fig. 2.
Figure 4:
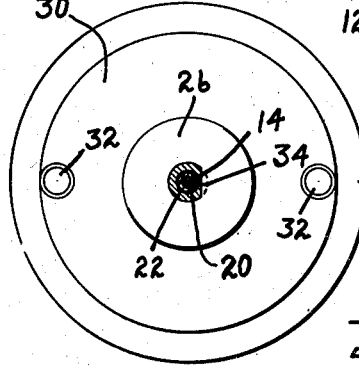
Fig. 4 is a view taken on line 4—4 of Fig. 3.

Referring now to the drawings I have illustrated the present preferred form of my invention comprising a spool 2 formed with a peripheral groove 4 and a central hub 6. A bracket 8 having diametrically opposed handles 10 is secured by pin 12 to the shaft 14. Between the shaft 14 and the hub 6, I provide a bushing 16 having a lower collar 18 and a threaded upper extension 20.

Threadedly engaging the extension 20 I use a brass washer 22 having a flat side 24 and about the washer a brass friction disk 26 is mounted to separate the large nut 28 from the disk fiber 30 having handles 32. The brass disk 26 is formed with a flat sided aperture 34 for locking engagement with the washer 22.

A cap 36 is secured by bolt 38 to the shaft 14 and retains the elements in proper relation, and thus while holding one handle 10 and bracing the other handle, the reel may be wound by rotating the disk 30 through handles 32 when the nut 28 is properly tensioned the movement of the hub being transmitted through the friction disk 26 it being understood that the bushing and hub 6 are pressed into locking engagement.

However should the hooked fish turn to run, the line 2' will be permitted to unwind the reel against the winding movement of the disk 30 through the friction disk.

In addition I provide an angle bracket 40 on the bracket 8 for the spring arm 42 carrying a cylinder 44 bearing in braking relation with the reel, and this brake may be released from contact with the reel by pressing down on the extension 46 of the arm 42.

Thus the reel of my invention may be used with facility especially in fishing for large fish, to eliminate slack in the line, and to effect an automatically operating clutch to permit the reel to unwind under tension even while the operator is reeling in the line.

Having thus fully described my invention what I claim as new and desire to secure by Letters Patent is:

1. A fishing reel including a spool having a central open hub, a bushing locked in the hub and formed with an upper threaded extension, a washer on the extension and having a portion of its periphery flat, a winding disk rotatable about the washer, a tensioning nut on the extension and clutch means between the winding disk and the nut whereby increased tension on the line of the spool will permit retrograde movement of the spool while the winding disk is being rotated in winding direction.

2. A fishing reel including a spool having a central open hub, a bushing locked in the hub and formed with an upper threaded extension, a washer on the extension and having a portion of its periphery flat, a winding disk rotatable about the washer, a tensioning nut on the extension and a friction disk between the winding disk and the nut whereby increased tension on the line of the spool will permit retrograde movement of the spool while the winding disk is being rotated in winding direction.

3. A fishing reel including a spool having a central open hub, a bushing locked in the hub and formed with an upper threaded extension, a washer on the extension and having a portion of its periphery flat, a winding disk rotatable about the washer, a tensioning nut on the extension and a disk between the winding disk and the nut whereby increased tension on the line of the spool will permit retrograde movement of the spool while the winding disk is being rotated in winding direction.

RICHARD L. CANNON.

REFERENCES CITED

The following references are of record in the file of this patent:

UNITED STATES PATENTS

| Number | Name | Date |
|---|---|---|
| 1,358,049 | Atwood | Nov. 9, 1920 |
| 2,190,983 | Gulbrandsen | Feb. 20, 1940 |